US012223447B2

(12) United States Patent
Kim et al.

(10) Patent No.: US 12,223,447 B2
(45) Date of Patent: Feb. 11, 2025

(54) DRONE TAXI SYSTEM BASED ON MULTI-AGENT REINFORCEMENT LEARNING AND DRONE TAXI OPERATION USING THE SAME

(71) Applicants: Korea University Research and Business Foundation, Seoul (KR); AJOU UNIVERSITY INDUSTRY-ACADEMIC COOPERATION FOUNDATION, Suwon-si (KR)

(72) Inventors: Joongheon Kim, Seoul (KR); Won Joon Yun, Seoul (KR); Jae-Hyun Kim, Seoul (KR); Soyi Jung, Suwon-si (KR)

(73) Assignees: Korea University Research and Business Foundation, Seoul (KR); AJOU University Industry-Academic Cooperation Foundation, Suwon-si (KR)

( * ) Notice: Subject to any disclaimer, the term of this patent is extended or adjusted under 35 U.S.C. 154(b) by 227 days.

(21) Appl. No.: 17/690,231

(22) Filed: Mar. 9, 2022

(65) Prior Publication Data
US 2022/0300870 A1    Sep. 22, 2022

(30) Foreign Application Priority Data
Mar. 17, 2021    (KR) .................. 10-2021-0034692

(51) Int. Cl.
*G06Q 10/0631*    (2023.01)
*B64U 101/61*    (2023.01)
(Continued)

(52) U.S. Cl.
CPC ......... *G06Q 10/0631* (2013.01); *G01C 21/20* (2013.01); *B64U 2101/61* (2023.01); *B64U 2201/10* (2023.01); *G05D 1/101* (2013.01)

(58) Field of Classification Search
CPC ............ G01C 21/3438; G01C 21/3415; G06Q 10/02; G06Q 50/40; G06Q 10/0631; G06Q 10/08355; G06Q 10/047
See application file for complete search history.

(56) References Cited

U.S. PATENT DOCUMENTS

| 6,697,730 B2 * | 2/2004 | Dickerson .............. G07B 15/00 73/178 R |
| 10,197,411 B2 * | 2/2019 | Racah ..................... G01S 19/39 |

(Continued)

FOREIGN PATENT DOCUMENTS

| JP | 2012-73763 A | 4/2012 |
| KR | 10-2019-0095999 A | 8/2019 |

(Continued)

OTHER PUBLICATIONS

Jun, Won Joon et al., Distributed deep reinforcement learning for autonomous aerial eVTOL mobility in drone taxi applications, ICT Expressly, vol. 7, 2021 (Year: 2021).*

(Continued)

*Primary Examiner* — Scott L Jarrett
(74) *Attorney, Agent, or Firm* — NSIP Law

(57) ABSTRACT

Provided are a drone taxi system based on multi-agent reinforcement learning and a drone taxi operation method using the same. The drone taxi system includes a plurality of drone taxies configured to receive call information including departure point information and destination information from passenger terminals present within a certain range and a control server configured to receive call information of passengers from each drone taxi, select a candidate passenger depending on whether a passenger is present, generate travel route information of each drone taxi from drone state information of the plurality of drone taxies through multi- (Continued)

agent reinforcement learning, and transmit the travel route information to the drone taxi.

9 Claims, 8 Drawing Sheets

(51) Int. Cl.
*G01C 21/20* (2006.01)
*G05D 1/00* (2024.01)

(56) References Cited

U.S. PATENT DOCUMENTS

| | | | | |
|---|---|---|---|---|
| 10,438,137 | B2* | 10/2019 | Ratti | G06Q 10/063114 |
| 10,522,043 | B2* | 12/2019 | Chu | G06Q 50/30 |
| 11,168,995 | B2* | 11/2021 | Ludwick | B60L 53/66 |
| 11,441,916 | B1* | 9/2022 | Konrardy | G01C 21/3617 |
| 11,455,578 | B2* | 9/2022 | Qin | G06N 3/006 |
| 11,466,998 | B1* | 10/2022 | Williams | G06Q 10/0635 |
| 11,474,519 | B2* | 10/2022 | Hicok | G05D 1/228 |
| 11,507,894 | B2* | 11/2022 | Qin | G06Q 10/0833 |
| 11,514,543 | B2* | 11/2022 | Qin | G06Q 10/047 |
| 11,537,954 | B2* | 12/2022 | Qin | G06N 20/00 |
| 11,599,833 | B2* | 3/2023 | Buttolo | G06Q 10/0631 |
| 11,620,592 | B2* | 4/2023 | Ramot | G06Q 10/047 |
| | | | | 701/410 |
| 11,631,333 | B2* | 4/2023 | Wang | G06N 3/006 |
| | | | | 701/422 |
| 11,674,811 | B2* | 6/2023 | Shoval | G06Q 10/02 |
| | | | | 701/533 |
| 2008/0270019 | A1* | 10/2008 | Anderson | G06Q 50/30 |
| | | | | 705/1.1 |
| 2009/0248587 | A1* | 10/2009 | Van Buskirk | G06Q 10/063112 |
| | | | | 707/999.005 |
| 2012/0290652 | A1* | 11/2012 | Boskovic | G06Q 10/02 |
| | | | | 709/204 |
| 2015/0100530 | A1* | 4/2015 | Mnih | A63F 13/67 |
| | | | | 706/25 |
| 2015/0161554 | A1* | 6/2015 | Sweeney | G06Q 10/08355 |
| | | | | 705/7.15 |
| 2016/0098650 | A1* | 4/2016 | Ratti | G06Q 10/02 |
| | | | | 705/5 |
| 2017/0270447 | A1* | 9/2017 | Borean | H04W 4/023 |
| 2018/0039917 | A1* | 2/2018 | Buttolo | G06Q 10/109 |
| 2018/0114170 | A1* | 4/2018 | Barry | G06Q 10/06315 |
| 2018/0197418 | A1* | 7/2018 | Chu | G06Q 10/04 |
| 2019/0339087 | A1* | 11/2019 | Jindal | G06N 3/006 |
| 2020/0057967 | A1* | 2/2020 | Ratti | G06Q 10/02 |
| 2020/0175558 | A1* | 6/2020 | Fujimoto | G01C 21/3453 |
| 2020/0273346 | A1* | 8/2020 | Wang | G06N 3/08 |
| 2020/0286199 | A1* | 9/2020 | Maddipati | G01C 21/3438 |
| 2020/0364627 | A1* | 11/2020 | Qin | G06N 3/084 |
| 2021/0088350 | A1* | 3/2021 | Qiu | G01C 21/3492 |
| 2021/0233196 | A1* | 7/2021 | Qin | G06Q 10/06316 |
| 2022/0036411 | A1* | 2/2022 | Tan | G06Q 30/0211 |
| 2022/0260376 | A1* | 8/2022 | Dutta | G01C 21/3438 |
| 2022/0300870 | A1* | 9/2022 | Kim | G01C 21/20 |

FOREIGN PATENT DOCUMENTS

| | | |
|---|---|---|
| KR | 10-2019-0106941 A | 9/2019 |
| KR | 10-2032067 B1 | 10/2019 |
| KR | 10-2020-0108527 A | 9/2020 |
| WO | WO 2019/046103 A1 | 3/2019 |

OTHER PUBLICATIONS

Zhou, Ming et al., Multi-Agent Reinforcement Learning for Order-dispatching via Order-Vehicle Distribution Matching, CIKM'19, Nov. 2019 (Year: 2019).*

Mao, Chao et al., Dispatch of autonomous vehicles for taxi services: A deep reinforcement learning approach Transportation Research Part C, vol. 115, 2020 (Year: 2020).*

Gammelli, Daniele et al., Graph Neural Network Reinforcement Learning for Autonomous Mobility-on-Demand Systems 2021 60th IEEE Conference on Decision and Control (CDC), Dec. 2021 (Year: 2021).*

Tang, Xindi et al., Online operations of automated electric taxi fleets: An advisor-student reinforcement learning framework Transportation Research Part C, vol. 121, 2020 (Year: 2020).*

Han, Miyoung et al., Routing an Autonomous Taxi with Reinforcement Learning Proceedings of the 25th ACM International on Conference on Information and Knowledge Management—CIKM '16, 2016 (Year: 2016).*

Rahili, Salar et al., Optimal Routing for Autonomous Taxis using Distributed Reinforcement Learning 2018 IEEE International Conference on Data Mining Workshops (ICDMW), 2018 (Year: 2018).*

Liu, Yong, et al., "Multi-agent game abstraction via graph attention neural network," Proceedings of the AAAI Conference on Artificial Intelligence, 2020, p. 7211-7218.

Rajendran, Suchithra, et al., "Air taxi service for urban mobility: A critical review of recent developments, future challenges, and opportunities," Transportation research part E: logistics and transportation review 143, 2020, 20 Pages.

Korean Office Action issued on Sep. 29, 2022, in counterpart Korean Patent Application No. 10-2021-0034692 (5 Pages in Korean).

* cited by examiner

Candidate Passenger Selection via Cosine Similarity

State Observation

G2ANet-based MADRL actions for drone-taxi transportation

DRONE TAXI SYSTEM BASED ON MULTI-AGENT REINFORCEMENT LEARNING AND DRONE TAXI OPERATION USING THE SAME

CROSS-REFERENCE TO RELATED APPLICATION

This application claims priority to and the benefit of Korean Patent Application No. 10-2021-0034692, filed on Mar. 17, 2021, the disclosure of which is incorporated herein by reference in its entirety.

BACKGROUND

1. Field of the Invention

The present invention relates to a drone taxi system based on multi-agent reinforcement learning and a drone taxi operation method using the same, and more particularly, to a drone taxi system for maximizing profits of a plurality of drone taxies by optimizing routes of the plurality of drone taxies through multi-agent reinforcement learning and a drone taxi operation method using the same.

2. Discussion of Related Art

Transportation refers to transporting people or goods to a certain destination. In the contemporary society, the movement of people and the transportation of goods are rapidly increasing with an increase in the population. Accordingly, various transportation services are emerging.

In terms of route, these transportation services may be classified into segmented transportation for moving in a determined course and autonomous transportation for moving each user to a set destination based on each user's request. Representatively, the former may be transportation services using airliners, liners, trains, buses, etc. and the latter may be transportation services using taxies, rental cars, etc.

Meanwhile, as an autonomous transportation service which is widely used in the public, a taxi can travel in variable routes to a destination in rapid response to a user's request, and thus it is possible to rapidly and flexibly respond to an environment.

These days, for the convenience of use, call taxi services, in which a passenger requests a taxi to come through a certain call center and then gets on the taxi, are widely used. Technological development in transportation services using drones, which are currently under rapid development, are attracting attention.

However, transportation technologies using drones are still in their early stage of development, and it is difficult to operate drone transportation using call taxi systems or the like because there is a big difference between a transportation method performed through a drone, which is a means of air transportation, and a transportation method performed through a transportation system using a ground transportation means.

Accordingly, with regard to drone taxi systems which are appropriately set for characteristics of drones, it is necessary to develop technologies for the drone taxi system which can be easily used by passengers of drone taxies and can derive an optimal route and transport a passenger along the optimal route and a drone taxi operation method using the drone taxi system.

As the related art, Korean Patent Registration No. 10-2032067 (Remote control device and method for unmanned aerial vehicle (UAV) based on reinforcement learning) was disclosed. However, the related art is based on single-agent reinforcement learning, and thus it is difficult to expect cooperative actions.

SUMMARY OF THE INVENTION

The present invention is directed to providing a drone taxi system for maximizing profits of a plurality of drone taxies by optimizing routes of the drone taxies through multi-agent reinforcement learning and a drone taxi operation method using the same.

According to an aspect of the present invention, there is provided a drone taxi system based on multi-agent reinforcement learning, the drone taxi system including a plurality of drone taxies configured to receive call information including departure point information and destination information from passenger terminals present within a certain range and a control server configured to receive call information of passengers from each drone taxi, select a candidate passenger depending on whether a passenger is present, generate travel route information of each drone taxi from drone state information of the plurality of drone taxies through multi-agent reinforcement learning, and transmit the travel route information to the drone taxi.

The control server may include a passenger selector configured to receive the call information of the passengers from the drone taxi and select the candidate passenger depending on whether an onboard passenger is present and a route optimizer configured to generate the travel route information of each drone taxi from the drone state information of the plurality of drone taxies through the multi-agent reinforcement learning and transmit the travel route information to the drone taxi. The drone state information may include at least one of current location information, onboard passenger information, candidate passenger information, and vacant seat information.

When there is no passenger in the drone taxi, the passenger selector may compare distances through the current location information of the drone taxi and the call information received from the drone taxi and determine the call information, which indicates a shortest distance from the current location of the drone taxi and allows a long-distance travel, to select the candidate passenger.

When there is no passenger in the drone taxi, the passenger selector may determine the call information on the basis of Equation 1 below using the current location information of the drone taxi and the call information received from the drone taxi to select the candidate passenger.

$$\underset{p_m}{\mathrm{argmax}}(|P_m^{dep} P_m^{des}| - |O_n P_m^{dep}|) \qquad \text{[Equation 1]}$$

(where $|O_n P_m^{dep}|$ denotes a distance value from a current location of an $n^{th}$ drone taxi to a departure point of an $m^{th}$ passenger, and $|P_m^{dep} P_m^{dep}|$ denotes a distance value from the departure point of the $m^{th}$ passenger to a destination)

When a passenger who allows a carpool is in the drone taxi, the passenger selector may analyze a cosine similarity between a travel direction based on the travel route information of the drone taxi and a travel direction based on the departure point and the destination of the received call information and select the call information which has a highest cosine similarity as the candidate passenger.

The route optimizer may include a graph definer configured to define relationships between the plurality of drone taxies as a graph structure using the drone state information of the drone taxies, an attention part configured to remove irrelevant edges by processing the graph structure and give weights, and a route generator configured to generate the travel route information of each drone taxi on the basis of the processed graph structure and transmit the travel route information to the drone taxi.

The control server may further include a compensator configured to process payment of a fare according to an onboard time in the onboard passenger information when destination arrival information is received from the drone taxi.

The compensator may compare the onboard time based on the onboard passenger information with the travel route information of the drone taxi to set a penalty according to a difference therebetween and may process the payment of the fare to which the set penalty is applied.

According to another aspect of the present invention, there is provided a drone taxi operation method using a drone taxi system based on multi-agent reinforcement learning, the drone taxi operation method including a passenger search operation in which a drone taxi searches for a passenger present within a certain range and receives call information including departure point information and destination information from passenger terminals, a passenger selection operation in which a control server receives the call information of passengers from the drone taxi and selects a candidate passenger depending on whether a passenger is present, and a route setting operation in which the control server generates travel route information of each drone taxi from drone state information of a plurality of drone taxies through multi-agent reinforcement learning and transmits the travel route information to the drone taxi.

The passenger selection operation may include, when there is no passenger in the drone taxi, comparing distances through the drone state information and the call information received from the corresponding drone taxi and determining the call information, which indicates a shortest distance from a current location of the drone taxi and allows a long-distance travel, to select the candidate passenger.

The passenger selection operation may include, when a passenger who allows a carpool is in the drone taxi, analyzing a cosine similarity between a travel direction based on the travel route information of the drone taxi and a travel direction based on the departure point and the destination of the received call information and selecting the call information having a highest cosine similarity as the candidate passenger.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
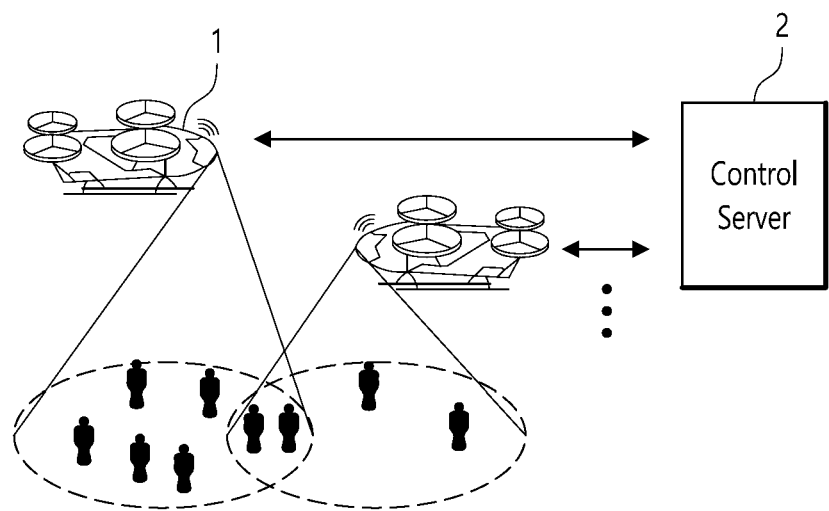
FIG. 1 is a diagram illustrating a drone taxi system based on multi-agent reinforcement learning according to an exemplary embodiment of the present invention.

The following description of the present invention based on the accompanying drawings is not limited to specific embodiments and may be variously modified, and the present invention may have a variety of embodiments. Also, it should be understood that the following description includes all alterations, equivalents, and substitutions within the spirit and technical scope of the present invention.

In the following description, terms including first, second, etc. are used for describing various components. These components are not limited by the terms, and the terms are used only for the purpose of distinguishing one component from another.

Throughout the specification, like reference numerals refer to like elements.

As used herein, the singular forms include the plural forms unless context clearly indicates otherwise. Also, the terms "comprise," "include," "have," etc. used herein should be interpreted as indicating the presence of features, numerals, steps, operations, components, parts, or combinations thereof stated in the specification and should not be understood as excluding the presence or addition of one or more other features, numerals, steps, operations, components, parts, or combinations thereof.

As used herein, the terms including "unit," "part," "module," etc. mean units that process at least one function or operation. The units may be implemented as hardware, software, or a combination of hardware and software.

Hereinafter, a drone taxi system based on multi-agent reinforcement learning and a drone taxi operation method using the drone taxi system according to exemplary embodiments of the present invention will be described in detail with reference to the accompanying drawings.

Figure 2:
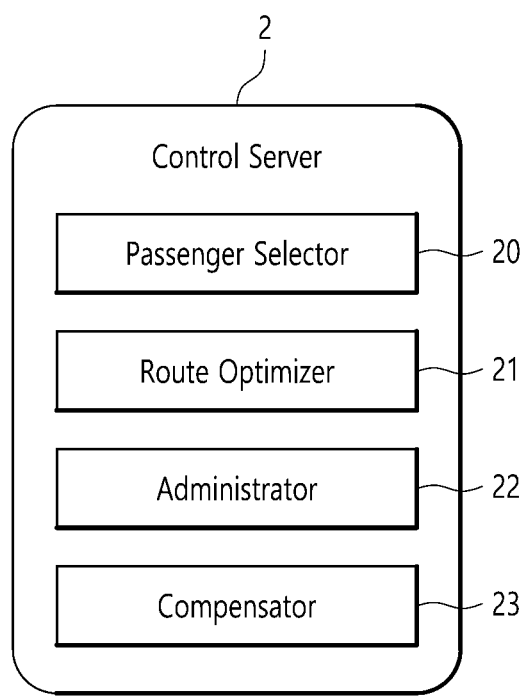
FIG. 2 is a block diagram illustrating a control server of a drone taxi system based on multi-agent reinforcement learning according to an exemplary embodiment of the present invention.
Figure 3:
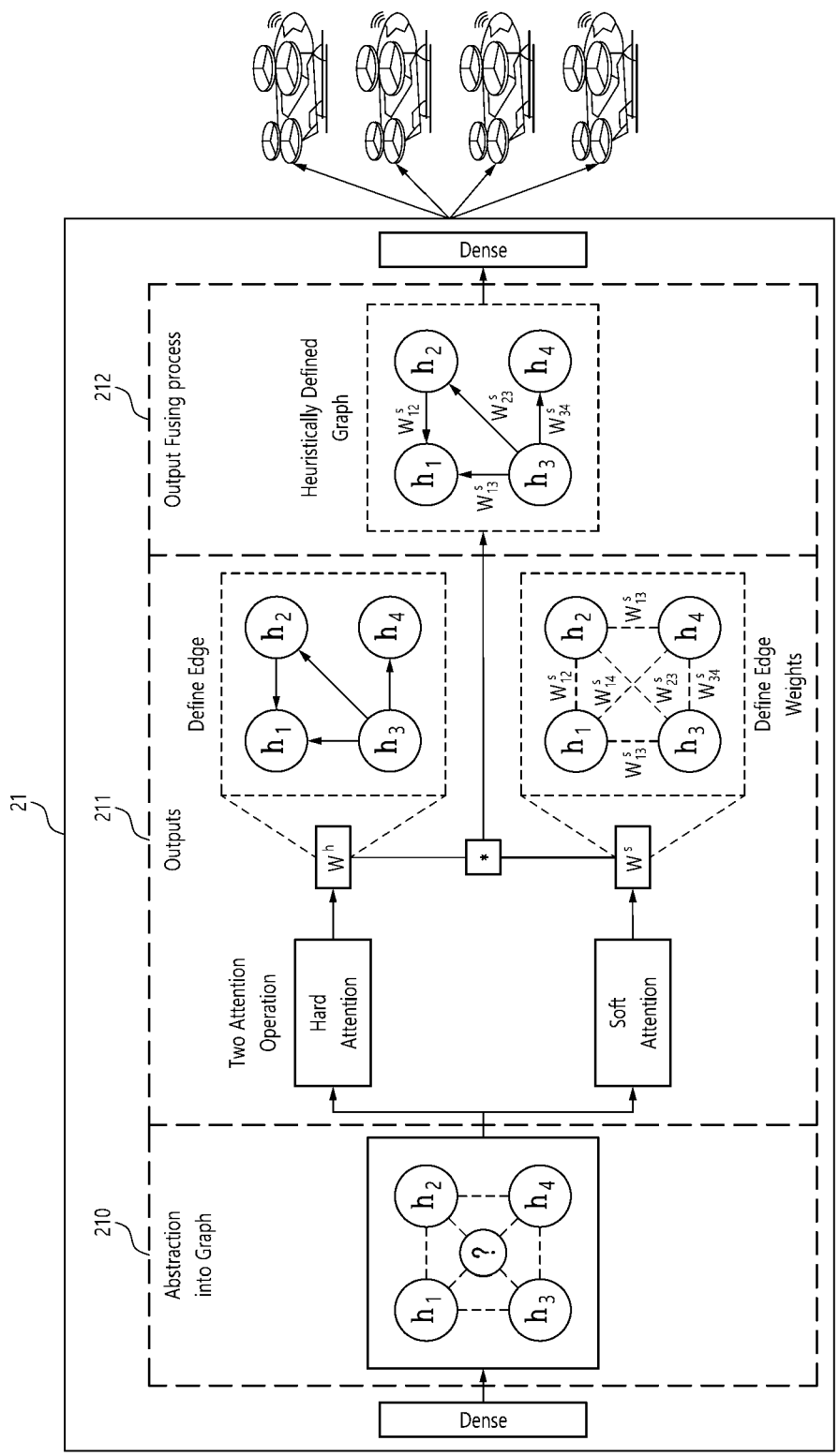
FIG. 3 is a diagram illustrating a structure of a route optimizer of FIG. 2.
Figure 4:
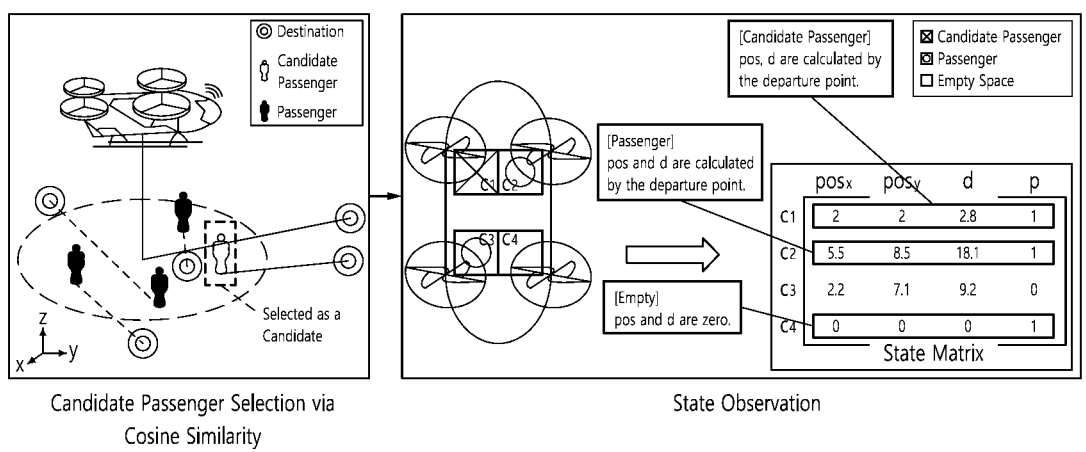
FIG. 4 is an example diagram illustrating a state matrix mapped to nodes (drone taxies) of a graph structure generated by the route optimizer of FIG. 2.

FIG. 1 is a diagram illustrating a drone taxi system based on multi-agent reinforcement learning according to an exemplary embodiment of the present invention. FIG. 2 is a block diagram illustrating a control server of a drone taxi system based on multi-agent reinforcement learning according to an exemplary embodiment of the present invention. FIG. 3 is a diagram illustrating a structure of a route optimizer of FIG. 2. FIG. 4 is an example diagram illustrating a state matrix mapped to nodes (drone taxies) of a graph structure generated by the route optimizer of FIG. 2.

The drone taxi system based on multi-agent reinforcement learning (hereinafter "drone taxi system") according to the exemplary embodiment of the present invention optimizes routes of a plurality of drone taxies and causes the drone taxies to take cooperative actions through a graph neural network (a game abstraction mechanism based on two-stage attention network (G2ANet)), thereby maximizing profits of drone taxies.

In other words, routes are optimized in a cooperative manner, and thus it is possible to solve traffic jam in a future smart city. Also, efficient operation and application of carpooling and the like are possible, and thus profits of drone taxies can be maximized.

Referring to FIG. 1, a drone taxi system may include passenger terminals (not shown), drone taxies 1, and a control server 2.

The passenger terminals may be mobile terminals possessed by people who want to use the drone taxies 1, that is, passengers. The passenger terminals include an application for using the drone taxi system. Accordingly, the passenger terminals receive call information from the passengers and thus may be detected by the drone taxies 1. The detected passenger terminals may transmit the call information to the drone taxies 1.

The call information may include departure point information, destination information, and whether carpooling is possible. However, the call information is not limited thereto and may additionally include various pieces of information such as a passenger number and the like.

The application enables passengers to use the drone taxi system of the present invention. The application is a general application based on Android or iOS but may be provided as a webservice-based application depending on terminal or wired or wireless service type. According to provision methods, a passenger may access a server through a terminal and download the application or download the application through an online application market (e.g., Google Play, Apple Store, an online market of a communication service provider, etc.), and install the application.

The passenger terminals may receive assignment information from the drone taxies 1. The assignment information may include a number, current location information, departure point arrival time information, etc. of an assigned drone taxi. However, the assignment information is not limited thereto and may include stopover information and the like when a carpool is made up.

The drone taxies 1 refer to drones that may carry passengers. Personal aerial vehicles (PAVs) or electric vertical takeoff and landing (eVTOL) may be used, but the drone taxies 1 are not limited thereto.

Each of the drone taxies 1 may detect passenger terminals present within a certain range through a communicator, receive call information from the detected passenger terminals, and transmit the call information to the control server 2.

The drone taxi 1 includes a global positioning system (GPS) and thus may transmit current location information to the control server 2 in real time.

The drone taxi 1 may receive travel route information from the control server 2 and travel according to the travel route information under the control of a controller.

When travel route information is received from the control server 2, the drone taxi 1 may transmit assignment information to a terminal of a passenger selected as a candidate passenger.

When the passenger boards, the drone taxi 1 may transmit boarding information (an onboard time, a boarding location, etc.) to the control server 2.

Upon arriving at a destination, the drone taxi 1 may transmit destination arrival information to the control server 2, and payment of the fare may be processed. To process the payment, the drone taxi 1 may include a payment terminal.

The control server 2 may select a passenger who will board each drone taxi 1 and design an optimal route to control travel of the drone taxi 1.

In other words, the control server 2 may receive call information of passengers from each drone taxi 1 to select a candidate passenger depending on whether an onboard passenger is present and may generate travel route information of each drone taxi 1 from drone state information of the plurality of drone taxies 1 through multi-agent reinforcement learning to control the drone taxies 1.

Referring to FIG. 2, the control server 2 may include a passenger selector 20, a route optimizer 21, an administrator 22, and a compensator 23.

The passenger selector 20 may receive call information of passengers from the drone taxi 1 and select a candidate passenger depending on whether a passenger is present. Here, the passengers may be candidate passengers or onboard passengers.

The onboard passengers may be passengers who are aboard the drone taxi 1, and a determination on onboard passengers may be made using drone state information of the drone taxi 1. In this case, only call information of passenger terminals to which the drone taxies 1 are not assigned may be used.

The drone state information of the drone taxi 1 may include at least one of current location information, onboard passenger information, candidate passenger information, and vacant seat information.

In other words, the passenger selector 20 may select a candidate passenger in consideration of three cases, that is, a case in which there is no passenger in the drone taxi 1, a case in which there is a passenger and a vacant seat, and a case in which there is no vacant seat.

First, when there is no passenger in the drone taxi 1, the passenger selector 20 may compare distances through the current location information of the drone taxi 1 and the call information received from the drone taxi 1 and determine call information, which indicates a shortest distance from the current location of the drone taxi 1 and allows a long-distance travel, to select a candidate passenger.

More specifically, the passenger selector 20 may determine call information having a maximum value through Equation 1 below and select the call information as a candidate passenger.

$$\underset{p_m}{\mathrm{argmax}}(|P_m^{dep} P_m^{des}| - |O_n P_m^{dep}|) \qquad \text{[Equation 1]}$$

Here, $|O_n P_m^{dep}|$ denotes a distance value from a current location of an $n^{th}$ drone taxi to a departure point of an $m^{th}$ passenger, $|P_m^{dep} P_m^{dep}|$ and denotes a distance value from the departure point to a destination of the $m^{th}$ passenger.

In this process, a first passenger of the drone taxi 1 may be selected.

Meanwhile, the number of seats in the drone taxi 1 is fixed, and thus the number of passengers who may board the drone taxi 1 may be limited.

Accordingly, when there are passengers but there is still a vacant seat, the passenger selector 20 may additionally select a candidate passenger. When there is no vacant seat, the passenger selector 20 may stop selecting a candidate passenger.

When calling the drone taxi 1, a passenger may select whether carpooling is possible. When the first selected passenger allows a carpool, the passenger selector 20 may additionally select a candidate passenger. When the first selected passenger allows no carpool, the passenger selector 20 may stop selecting a candidate passenger regardless of a vacant seat.

When there is a passenger (a candidate passenger or an onboard passenger) in the drone taxi 1, there may be a vacant seat, and the passenger may allow a carpool. In this case, the passenger selector 20 may analyze a cosine similarity between a travel direction based on travel route information of the drone taxi 1 and a travel direction based on a departure point and a destination of received call information and select call information which has the highest cosine similarity as a candidate passenger.

In other words, a passenger heading in a direction similar to a direction in which the drone taxi 1 currently travels may be selected as a candidate passenger such that a carpool may be made up more efficiently.

The travel direction based on the travel route information may be a direction in which the drone taxi 1 currently moves after the travel route information is set by the route optimizer 21 because a passenger is present.

The passenger selector 20 may repeat the above process until there is no vacant seat in the drone taxi 1.

The route optimizer 21 may generate travel route information of each drone taxi 1 from drone state information of a plurality of drone taxies 1 through G2ANet, which is a graph-based neural network, during multi-agent reinforcement learning and transmit the travel route information to each drone taxi 1.

Referring to FIG. 3, the route optimizer 21 may include a graph definer 210, an attention part 211, and a route generator 212.

The graph definer 210 may define relationships between the plurality of drone taxies 1 as a graph structure using drone state information of the drone taxies 1.

For example, assuming that there are four drone taxies 1 ($h_1$, $h_2$, $h_3$, and $h_4$), the drone taxies 1 may be represented as nodes in a graph structure as shown in FIG. 3, and the relationships between the drone taxies 1 may be represented as edges. In other words, the graph structure may include a set of the nodes, which are the drone taxies 1, and edges that represent relationships between the drone taxies 1.

Also, the graph definer 210 may generate a state matrix for each drone taxi 1 on the basis of drone state information. Such a state matrix may be mapped to each drone taxi (node) in the graph structure.

In the state matrix, action values including a variable which is set according to the drone state information of the drone taxies 1 are arranged. This will be described in further detail with reference to FIG. 4.

The variable of action values may include at least one of a direction vector [$POS_x$, $POS_y$], a distance [d], and a penalty [p]. The variable may include all of the direction vector [$POS_x$, $POS_y$], the distance [d], and the penalty [p], but is not limited thereto.

Referring to FIG. 4, assuming that the number of seats of the drone taxi 1 is four, that is, the maximum number of passengers aboard is four, and the drone taxi 1 has one onboard passenger and two candidate passengers, four action values $C_1$, $C_2$, $C_3$, and $C_4$ may be set to be taken by the drone taxi 1.

It is assumed that drone state information of the drone taxi 1 includes two pieces of onboard passenger information, one piece of candidate passenger information, and vacant seat information (vacant seat 1).

Accordingly, when an action value is based on the candidate passenger information, the direction vector [$POS_x$, $POS_y$] and the distance [d] may be set according to departure point information in the candidate passenger information as indicated by [$C_1$]. In this case, an onboard time may be set to "0" in the candidate passenger information. This is because the passenger has not boarded the drone taxi 1 yet.

For this reason, there is no change in the boarding time, and the penalty [p] does not apply. Therefore, the penalty [p] may be set to "1."

When an action value is based on the onboard passenger information, the direction vector [$POS_x$, $POS_y$] and the distance [d] may be set according to destination information in the onboard passenger information as indicated by [$C_2$] and [$C_3$] In this case, an onboard time in the onboard passenger information may be set to a current time. Since time is passing with the passengers on board, the penalty [p] may vary depending on the current time until the onboard passengers get off and apply. A method of calculating the penalty will be described in detail below with reference to the compensator 23.

Meanwhile, when the penalty [p] calculated according to the onboard time has a positive value, the penalty [p] may be set to "1" as indicated by [$C_4$] and when the penalty calculated has a negative value, the penalty may be set to "0" as indicated by [$C_3$].

When an action value is based on the vacant seat information, the direction vector [$POS_x$, $POS_y$] and the distance [d] may be set to "0" as indicated by [$C_4$].

The reason is that a departure point where the candidate passengers are present is important because the candidate passengers have not boarded the drone taxi 1 yet and a destination where the onboard passenger wants to go is important because the passenger has boarded the drone taxi 1 already.

The attention part 211 may remove irrelevant edges by processing the graph structure defined by the graph definer 210 and give weights.

More specifically, the attention part 211 may include hard attention and soft attention.

Hard attention may remove interference between irrelevant drone taxies 1 by processing the graph structure defined by the graph definer 210. Accordingly, the relationships between the drone taxies 1 may be simplified.

Soft attention may process the graph structure defined by the graph definer 210 and give weights $W^s$ according to the degree of relationship between drone taxies 1. The higher the degree of relationship, the higher weight $W^s$ may be given to the edge between the drone taxies 1.

The route generator 212 may generate travel route information of each drone taxi on the basis of the graph structures processed by the attention part 211.

In other words, the route generator 212 may acquire one graph structure by combining the graph structure, in which interference is processed, obtained from hard attention and the graph structure, to which weights are given, obtained from soft attention and design travel route information using action values of a state matrix of each drone taxi 1 on the basis of the graph structure.

The generated travel route information may be transmitted to each drone taxi 1 such that travel of the drone taxi 1 may be controlled according to the travel route information.

The route optimizer 21 may perform a process of generating travel route information every time the drone state information of the drone taxi 1 is updated, but the present invention is not limited thereto.

The administrator 22 may manage the drone state information of the drone taxi 1 by updating the drone state information in real time.

The drone state information of the drone taxi 1 may include at least one of current location information, onboard passenger information, candidate passenger information, and vacant seat information.

The onboard passenger information may include departure point information, destination information, and an onboard time, which may indicate a time that has passed since boarding.

Also, the candidate passenger information may include departure point information, destination information, and an onboard time, and the onboard time of the candidate passenger information may be set to "0" because the candidate passengers have not boarded yet.

When a candidate passenger is selected by the passenger selector 20, current location information, boarding information, destination arrival information, etc. are received from the drone taxi 1, and the administrator 22 may update the drone state information.

When the destination arrival information is received from the drone taxi 1, the compensator 23 may process payment of the fare according to onboard time (a time that the passenger is actually aboard—a boarding start time and a boarding end time) in the passenger information.

This compensates the passenger for a time loss by giving a penalty to the passenger when the drone taxi 1 takes a longer time than an optimal travel time based on the travel route information.

More specifically, when the destination arrival information is received from the drone taxi 1, the compensator 23 may compare the onboard time in the onboard passenger information with the optimal travel time and set a penalty according to the difference.

In this case, the compensator 23 may derive the penalty according to Equation 2 below.

$$p = \frac{t^{opt} - (t^{arr} - t^{dep})}{t^{opt}}$$ [Equation 2]

Here, p denotes a penalty, $t^{opt}$ is an optimal travel time, $t^{arr}$ denotes an arrival time, and $t^{dep}$ denotes a departure time. ($t^{arr}-t^{dep}$) denotes an onboard time which is a time that a passenger is actually aboard.

The time that the passenger is actually aboard versus the optimal travel time is observed as a ratio through Equation 2 above to give a penalty such that the passenger and the drone taxi 1 may be compensated.

For example, when a result of comparing the onboard time based on the onboard passenger information with the optimal travel time indicates that the onboard time is longer than the optimal travel time, the penalty p generated by the compensator 23 may have a negative value. The penalty may be applied to the fare such that the fare may be reduced.

In this way, the passenger may be compensated for the time loss.

On the other hand, when the result of comparing the onboard time based on the onboard passenger information with the optimal travel time indicates that the onboard time is shorter than the optimal travel time, the penalty p generated by the compensator 23 may have a positive value. The penalty may be applied to the fare such that the fare may be increased.

Accordingly, the drone taxi 1 may obtain additional profit by providing temporal benefit to the passenger.

A drone taxi operation method using the drone taxi system based on multi-agent reinforcement learning will be described in detail below.

Figure 5:
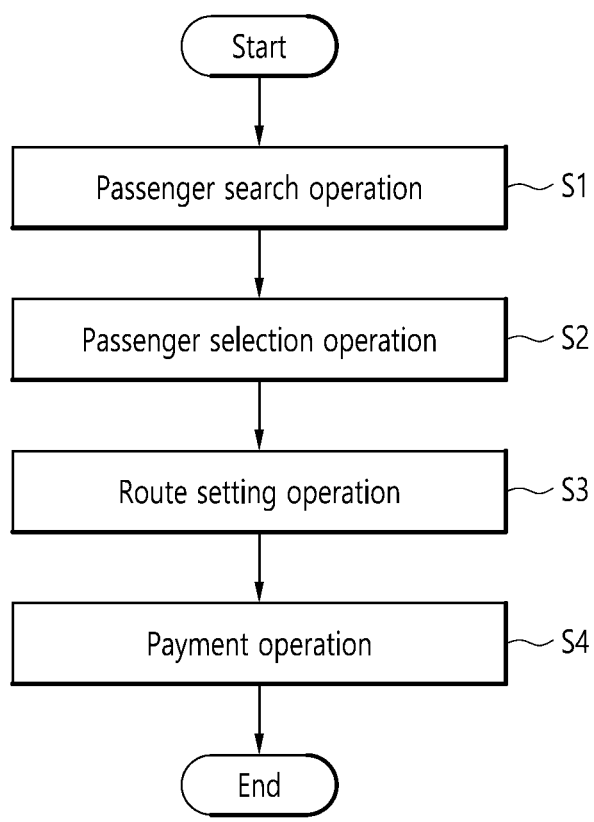
FIG. 5 is a flowchart schematically illustrating a drone taxi operation method using a drone taxi system based on multi-agent reinforcement learning according to an exemplary embodiment of the present invention.
Figure 6:
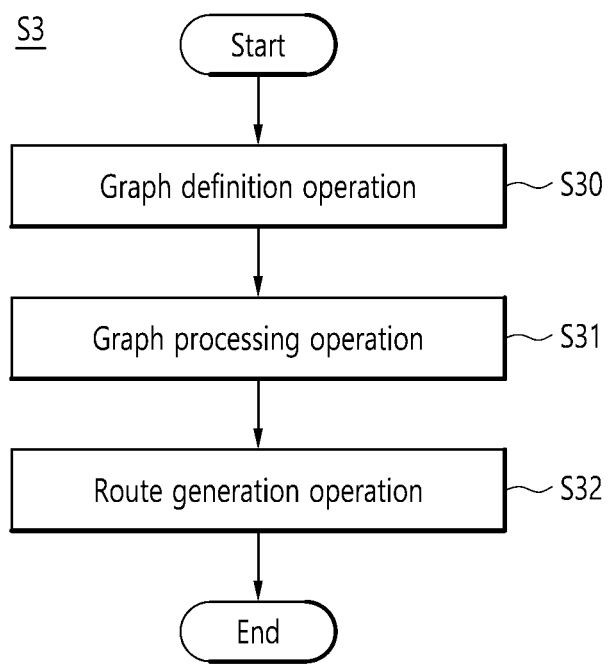
FIG. 6 is a flowchart sequentially illustrating a route setting operation of FIG. 5.

FIG. 5 is a flowchart schematically illustrating a drone taxi operation method using a drone taxi system based on multi-agent reinforcement learning according to an exemplary embodiment of the present invention, and FIG. 6 is a flowchart sequentially illustrating a route setting operation of FIG. 5.

Referring to FIG. 5, the drone taxi operation method using a drone taxi system based on multi-agent reinforcement learning according to the exemplary embodiment of the present invention may include a passenger search operation S1, a passenger selection operation S2, a route setting operation S3, and a payment operation S4.

First, in the passenger search operation S1, the drone taxies 1 may search for passengers present within a certain range and receive call information including departure point information and destination information from passenger terminals present within the certain range.

Also, in the operation S1, the drone taxies 1 may transmit the received call information and current location information to the control server 2.

In the passenger selection operation S2, the control server 2 may receive the call information from the drone taxies 1 and select a candidate passenger depending on whether a passenger is present.

In the operation S2, a candidate passenger may be selected in consideration of three cases, that is, a case in which there is no passenger in the drone taxies 1, a case in which a passenger is present but there is still a vacant seat, and a case in which there is no vacant seat. This has been described above with reference to the system, and the detailed description will not be reiterated.

In the route setting operation S3, the control server 2 may generate travel route information of each drone taxi 1 from drone state information of the plurality of drone taxies 1 through multi-agent reinforcement learning and transmit the travel route information to each drone taxi 1.

The operation S3 may include a graph definition operation S30, a graph processing operation S31, and a route generation operation S32.

In the graph definition operation S30, the control server 2 may define relationships between the plurality of drone taxies 1 as a graph structure using the drone state information of the drone taxies 1.

In the graph processing operation S31, the graph structure defined in the operation S30 may be processed to remove irrelevant edges, and weights may be given.

In the route generation operation S32, travel route information of each drone taxi 1 may be generated on the basis of the graph structure processed in the operation S31.

This has been described in detail above with reference to the system, and the detailed description will not be reiterated.

In the payment operation S4, when destination arrival information is received from the drone taxies 1, the control server 2 may process payment of fares according to onboard times in onboard passenger information. A detailed description thereof will be omitted.

As described above, the drone taxi system based on multi-agent reinforcement learning and the drone taxi operation method using the drone taxi system according to exemplary embodiments of the present invention can maximize profits of a plurality of drone taxies by optimizing routes of the drone taxies through multi-agent reinforcement learning.

Also, the drone taxi system and the drone taxi operation method can save time and money consumed in passenger transportation.

Further, when a drone taxi travels longer than the expected time, it is possible to reduce the fare, and thus the passenger can be compensated for a time loss.

The above-described present invention will be described in further detail below with reference to an experimental example and the exemplary embodiments. However, the present invention is not necessarily limited to the experimental example and the exemplary embodiments.

[Experimental Example 1] Comparison Between Drone Taxi Routes

To evaluate the drone taxi system according to the exemplary embodiment of the present invention, drone taxi routes of systems to which the exemplary embodiment and Comparative Example of the present invention are applied are analyzed.

In a 25 km×25 km two dimensional (2D) vector space, it is assumed that four drone taxies are used as agents and there are 20 passengers. To the Comparative Example, a random action algorithm is applied.

The results are shown in FIG. 7.

Figure 7A:
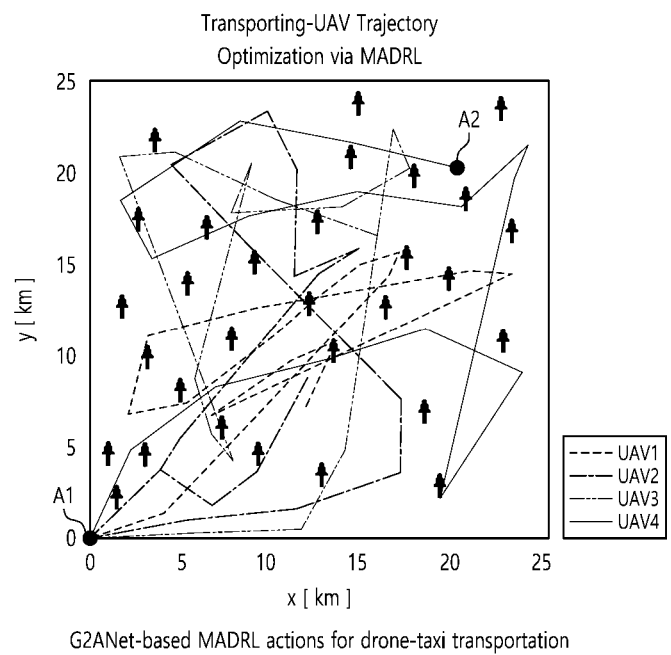
FIGS. 7A and 7B are graphs illustrating drone taxi routes according to the exemplary embodiment and Comparative Example of the present invention.
Figure 7B:
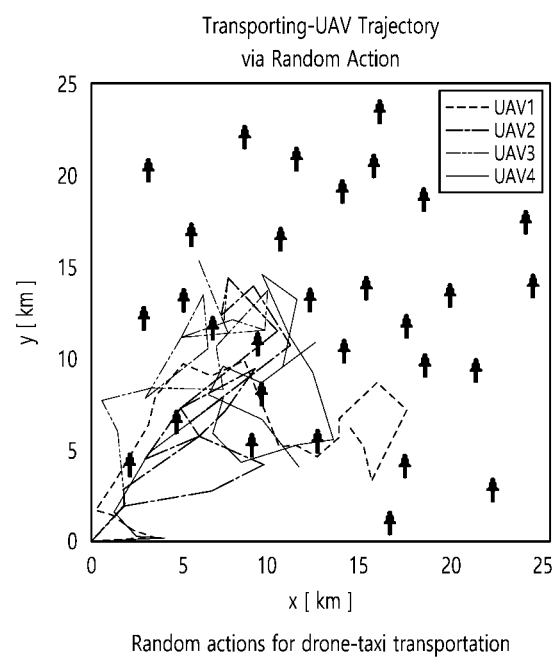

FIGS. 7A and 7B are graphs illustrating drone taxi routes according to the exemplary embodiment and Comparative Example of the present invention.

As shown in FIG. 7, the exemplary embodiment of the present invention is run with a better route than Comparative Example, and thus it is possible to serve a larger number of passengers within a wider range.

The above-described drone taxi system based on multi-agent reinforcement learning and the drone taxi operation method using the drone taxi system according to the exemplary embodiments of the present invention can maximize profits of a plurality of drone taxies by optimizing routes of the drone taxies through multi-agent reinforcement learning.

Also, the drone taxi system and the drone taxi operation method can save time and money consumed in passenger transportation.

Further, when a drone taxi takes longer than the expected time, it is possible to reduce the fare, and thus the passenger can be compensated for a time loss.

Although exemplary embodiments of the present invention have been described with reference to the accompanying drawings, those of ordinary skill in the art should understand that the present invention can be implemented in other specific forms without changing the technical spirit or necessary features of the present invention. Therefore, the above-described embodiments are exemplary and are not limiting in all aspects.

What is claimed is:

1. A processor-implemented drone taxi system comprising:
    a plurality of drone taxies configured to receive call information including a departure location point and a destination location point from passenger terminals present within a certain range; and
    a control server configured to receive call information of passengers from each drone taxi, select a candidate passenger depending on whether a passenger is present, generate travel route information of each drone taxi from drone state information of the plurality of drone taxies using an optimization model trained through multi-agent reinforcement learning, transmit the travel route information to each drone taxi, and control each drone taxi to travel, according to the generated travel route information and under a control of the control server, to a departure location point of the selected candidate passenger, the controlling further including controlling each drone taxi to update a route of the traveling to be set with the generated travel route information and controlling each drone taxi to transmit assignment information and boarding information to a terminal of the selected candidate passenger,
    wherein the control server comprises:
        a passenger selector configured to receive the call information of the passengers from each drone taxi and select the candidate passenger depending on whether a passenger is present; and
        a route optimizer configured to, every time the drone state information of each of the plurality of drone taxies is changed and updated, re-generate the travel route information of each drone taxi from the drone state information of the plurality of drone taxies using the optimization model trained through the multi-agent reinforcement learning and transmit the travel route information to each drone taxi, and
        the drone state information includes current location information, onboard passenger information, candidate passenger information, and vacant seat information,
    wherein the optimization model is trained using a two-stage attention mechanism trained through multi-agent reinforcement learning.

2. The drone taxi system of claim 1, wherein, when there is no passenger in the drone taxi, the passenger selector compares distances through the current location information of the drone taxi and the call information received from the drone taxi and determine the call information, which indicates a shortest distance from the current location of the drone taxi and allows a long-distance travel, to select the candidate passenger.

3. The drone taxi system of claim 1, wherein, when a passenger who allows a carpool is in the drone taxi, the passenger selector analyzes a cosine similarity between a travel direction based on the travel route information of the drone taxi and a travel direction based on the departure location point and the destination location point of the received call information and selects the call information which has a highest cosine similarity as the candidate passenger.

4. The drone taxi system of claim 1, wherein the route optimizer comprises:
    a graph definer configured to define relationships between the plurality of drone taxies as a graph structure using the drone state information of the drone taxies;
    an attention part configured to remove irrelevant edges by processing the graph structure and give weights; and
    a route generator configured to generate the travel route information of each drone taxi on the basis of the processed graph structure and transmit the travel route information to the drone taxi.

5. The drone taxi system of claim 1, wherein the control server further comprises a compensator configured to process payment of a fare according to an onboard time in the onboard passenger information when arrival information is received from the drone taxi.

6. The drone taxi system of claim 5, wherein the compensator compares the onboard time based on the onboard passenger information with the travel route information of the drone taxi to set a penalty according to a difference therebetween and processes the payment of the fare to which the set penalty is applied.

7. A processor-implemented method using a drone taxi system based on multi-agent reinforcement learning, the drone taxi operation method comprising:
- a passenger search operation in which a drone taxi searches for a passenger present within a certain range and receives call information including a departure location point and a destination location point from passenger terminals;
- a passenger selection operation in which a control server receives the call information of passengers from the drone taxi and selects a candidate passenger depending on whether a passenger is present; and
- a route setting operation in which the control server generates travel route information of each drone taxi from drone state information of a plurality of drone taxies using an optimization model trained through the multi-agent reinforcement learning, transmits the travel route information to each drone taxi, and control each drone taxi to travel, according to the generated travel route information and under a control of the control server, to a departure location point of the selected candidate passenger, the controlling further including controlling each drone taxi to update a route of the traveling to be set with the generated travel route information and controlling each drone taxi to transmit assignment information and boarding information to a terminal of the selected candidate passenger, wherein the control server comprises:
- a passenger selector configured to receive the call information of the passengers from each drone taxi and select the candidate passenger depending on whether a passenger is present; and
- a route optimizer configured to, every time the drone state information of each of the plurality of drone taxies is changed and updated, re-generate the travel route information of each drone taxi from the drone state information of the plurality of drone taxies using the optimization model trained through the multi-agent reinforcement learning and transmit the travel route information to each drone taxi,
wherein the drone state information includes current location information, onboard passenger information, candidate passenger information, and vacant seat information, and
wherein the optimization model is trained using a two-stage attention mechanism trained through multi-agent reinforcement learning.

8. The drone taxi operation method of claim 7, wherein the passenger selection operation comprises, when there is no passenger in the drone taxi, comparing distances through the drone state information and the call information received from the corresponding drone taxi and determining the call information, which indicates a shortest distance from a current location of the drone taxi and allows a long-distance travel, to select the candidate passenger.

9. The drone taxi operation method of claim 7, wherein the passenger selection operation comprises, when a passenger who allows a carpool is in the drone taxi, analyzing a cosine similarity between a travel direction based on the travel route information of the drone taxi and a travel direction based on the departure location point and the destination location point of the received call information and selecting the call information having a highest cosine similarity as the candidate passenger.

* * * * *